(No Model.) 2 Sheets—Sheet 2.
C. O. SOBINSKI.
BICYCLE SIGNAL ALARM AND BRAKE.
No. 593,786. Patented Nov. 16, 1897.
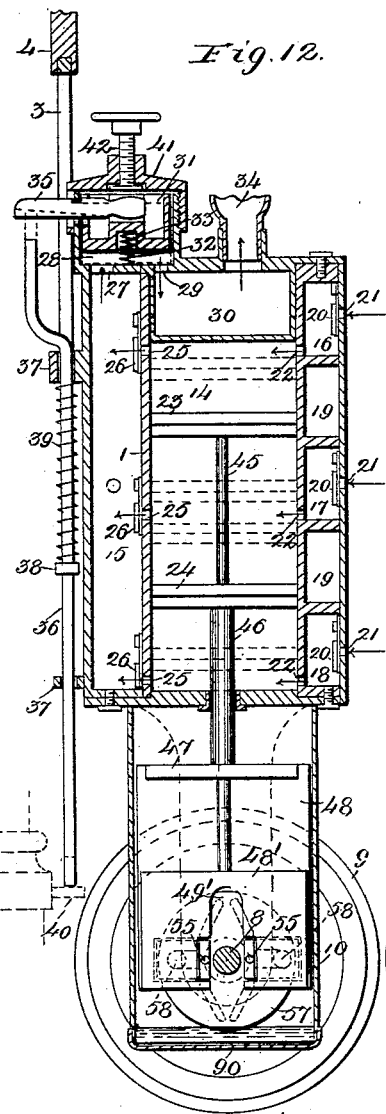
Witnesses
Lee Sale
W. B. Wells
Inventor
C. O. Sobinski
By his Attorneys,
Keller & Stover

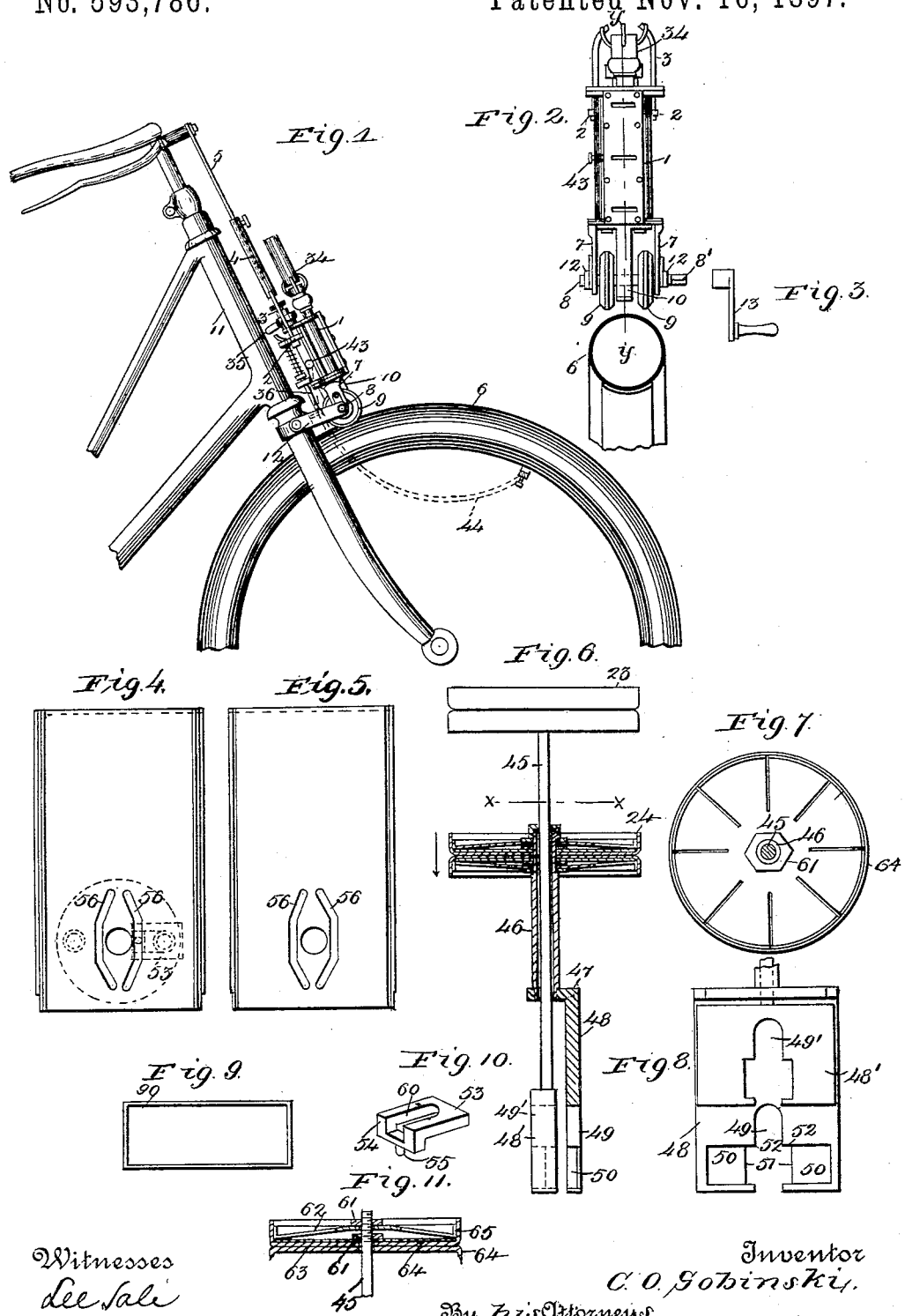

UNITED STATES PATENT OFFICE.

CHARLES O. SOBINSKI, OF ST. LOUIS, MISSOURI.

BICYCLE SIGNAL-ALARM AND BRAKE.

SPECIFICATION forming part of Letters Patent No. 593,786, dated November 16, 1897.

Application filed October 26, 1895. Renewed September 17, 1896. Serial No. 606,176. (No model.)

*To all whom it may concern:*

Be it known that I, CHARLES O. SOBINSKI, a citizen of the United States, residing at St. Louis, in the State of Missouri, have invented certain new and useful Improvements in Bicycle Signal-Alarms, of which the following is a full, clear, and exact description, reference being had to the accompanying drawings, forming a part hereof.

My invention has relation to bicycle signal-alarms; and it consists in the novel arrangement and combination of parts more fully set forth in the specification and pointed out in the claims.

In the drawings, Figure 1 is a side elevation of a portion of a bicycle having my improvement attached thereto. Fig. 2 is a front elevation of the attachment, showing a portion of the tire of the wheel in proximity thereto. Fig. 3 is a side elevation of a detachable crank-arm by which the pump of the device can be operated independently of the driving-wheel of the machine. Figs. 4 and 5 are inside views of the opposite side walls of the depending extension through which the drive-shaft passes and which will be hereinafter more particularly referred to. Fig. 6 is a part vertical section and part elevation of the double piston driving the air from the air-pump to the whistle or other signal device. Fig. 7 is a section on the line *x x* of Fig. 6, showing a plan view of one of the double-piston heads. Fig. 8 is a side elevation of the plates carried at the lower ends of the piston-rods when the pistons have reached their extreme outward stroke. Fig. 9 is a plan view of the bottom plate, constituting the oil-basin of the depending extension above referred to. Fig. 10 is a perspective view of one of the dogs carried by the plates secured to the piston-rods. Fig. 11 is a middle section taken through one of the piston-heads, showing in an exaggerated manner the relative position of the several parts comprising the same. Fig. 12 is an enlarged longitudinal middle section taken through the line *y y* of Fig. 2. Fig. 13 is an elevation of the driving-disk confined within the depending extension of the main casing. Fig. 14 is a side elevation of the same. Fig. 15 is a view similar to Figs. 4 and 5, showing the extreme position of the dogs carried by the piston-rod plates relative to the cam-slots formed in the side walls of the depending extension. Fig. 16 is a view similar to Fig. 8, but with the dogs carried by the plates in position to correspond with the extreme limits of the strokes of the pistons; and Fig. 17 is a side view of the parts shown in Fig. 16 with the driving-disk which coöperates with the dogs interposed between the dog-supporting plates.

The object of my invention is to construct a signal-alarm for bicycles which under certain circumstances will serve the purpose of an alarm-whistle, under other circumstances as a brake for the front wheel of the cycle, and under still other circumstances as a means for inflating the tire of the wheel in cases where necessity demands it. To this end I have devised an attachment which is controlled by the brake-rod of the machine and operated by the running-gear of the bicycle, and which in detail may be described as follows:

Referring to the drawings, 1 represents a casing of substantially a cylindrical shape, having formed integral with the outer wall of the same a lug 2, by means of which the casing is secured to the free ends of the forked members or yoke 3, carried at the lower end of a hollow coupling-bar 4, which can be adjustably secured along the brake-rod 5. In this way the casing becomes directly connected with the brake-rod. Depending from either side of the bottom of the casing and disposed at right angles to the plane of rotation of the wheel 6 are arms 7, which serve to support between them a shaft 8, designed to carry the contact-disks 9, each of which is adapted to coöperate with the tire of the wheel 6 on either side of the medial peripheral line of said tire. As seen from the drawings, the shaft 8 passes through the side walls of a depending extension or chamber 10, carried by the main casing 1, said walls serving as additional bearings for the shaft 8. The outer ends of the shaft 8 are pivotally connected to the front post 11 of the bicycle by the oscillating links 12. It is obvious from the foregoing description that as the brake-rod 5 is depressed in the usual way the disks 9 will be brought into engagement with the tire of the wheel and as the latter revolves will be set in motion by frictional contact with the tire, thereby imparting rotation to the shaft 8, the casing being held against displacement during the engagement of these parts by the links 12. One end of the shaft 8 projects out a suitable distance and has a polygonal reduced portion 8', over which may be passed the engaging socket of a suitable crank-arm 13, whereby rotation may be imparted to the shaft 8 independent of the tire, for a purpose to be subsequently explained.

The casing 1 is divided interiorly into an inner air-cylinder 14, an air-storage chamber 15 on one side thereof and extending the full length of the casing, and a series of air-inlet compartments 16 17 18, separated by intermediate air-tight compartments 19, each air-inlet compartment being provided with a flap-valve 20, coöperating with an air inlet or opening 21, and being further provided with an air-escape opening 22, leading into the air-cylinder 14. The air-cylinder is provided with two oppositely-reciprocating pistons 23 and 24, respectively, which as they reciprocate to and from one another force the air which is drawn between them and on opposite sides of them through the discharge-openings 25 (controlled by flap-valves 26) into the air-storage chamber 15. The pistons 23 and 24 with their coöperating parts are here denominated as the "air-pump," and the manner of reciprocating the pistons by the rotation of the shaft 8 will be subsequently explained in detail. Superposed over and communicating with the storage-chamber 15 by an opening 27 is a valve-chamber 28, the bottom of which also communicates by means of an opening 29 with an expanding-chamber 30, located at one end of the air-cylinder 14. Within the valve-chamber 28 is located a hollow valve 31, kept normally a slight distance above the opening 27, leading to the chamber, by a spring 32, having one end resting at the bottom of the chamber and the other confined within a suitable depression or cavity 33 at the base of the valve. When in said position, the air from the chamber 15 passes by the said valve through the opening 29 into the expanding-chamber 30, and thence to a suitable alarm-whistle 34, communicating therewith.

It may be stated in passing that when the brake-rod 5 is depressed, so as to bring the disks 9 into engagement with the tire of the wheel, rotation is imparted to the shaft 8, which in turn operates the air-pump, in a manner to be presently described, the air thus pumped being forced into the whistle in the manner indicated and thus sounding an alarm. It is obvious, however, that if during the operation of the air-pump the valve 31 were seated or depressed against the resiliency of the spring 32, so as to cut off communication between the chamber 15 and chamber 30, the action of the whistle would cease, and eventually the chamber 15 would be stored so full of air and the latter be so greatly compressed therein and offer such an increased resistance to the reciprocation of the pistons 23 24 as to cause the latter to stop against the frictional driving contact existing between the disks 9 and the tire of the wheel. The stopping of the pistons would of course prevent, as will be seen from the connections to be presently described, the rotation of the disks 9 already in contact with the tire, the disks thus stopped acting in the nature of a brake for the machine.

The means for effecting the result just described are as follows: Projecting through an opening of the side wall of the chamber 28 is a rocking arm 35, having its inner end superposed over the base of the depression 33 of the hollow valve and its outer end superposed a suitable distance over the upper end of a rod 36, passing through and guided by suitable lugs 37, secured to the side wall of the casing 1. The rod 36 carries a collar 38 between the two lugs, and resting on said collar is one end of a controlling-spring 39, which encircles the rod, the opposite end bearing against the upper lug 37. The lower end of the rod 36 rests upon a pin or arm 40, carried by and projecting from the front post 11 and located between the links 12. (See Fig. 1.) Under ordinary circumstances when the disks 9 are brought into engagement with the wheel-tire by the depression of the brake-rod 5, so as to set the air-pump into operation, the outer free end of the rocking arm 35 barely touches the upper end of the rod 36; but a further depression of the brake-rod 5, followed, of course, by a consequent firmer contact between the disks 9 and the wheel-tire, will cause the upper end of the rod 36 to tilt upwardly the free end of the arm 35, causing the inner end thereof to tilt downward and thus depress the valve 31 sufficiently to close the opening 27, producing the result above referred to—that is to say, cutting off communication from the whistle and converting the device into a brake apparatus. When the pressure is removed from the brake-rod 5, the spring 39 will restore the several parts to their normal position. In addition to the automatic means for closing the valve 31 I provide the chamber 28 with a cover 41, which is screwed to the side walls and constitutes the top wall of the chamber, the cover being provided with a controlling-screw 42, which can be forced down sufficiently against the inner end of the rocking arm 35 to cause the latter to depress the valve 31 and thus cut off communication between the chamber 15 and expansion-chamber 30. This is sometimes resorted to when it is desired to inflate the tire from which some of the air has escaped. The operator simply attaches the crank-handle 13 to the shaft 8, imparting rotation to the latter and pumping air into the chamber 15. The chamber is ordinarily provided with a plug 43, which can be removed and one end of a rubber tube 44 inserted, the opposite end of the tube being made to effect communication between the chamber 15 and the inside of the pneumatic tire. (See Fig. 1, dotted lines showing this arrangement.)

Thus it is apparent that the same device may be used for purposes of sounding an alarm, for acting as a brake mechanism, and for further use in the inflation of an exhausted tire.

I will now describe the means whereby reciprocation is imparted to the pistons by reason of the rotation of the disks 9 and shaft 8. The piston-rod 45 of the piston-head 23 is embraced by the hollow piston-rod 46 of the piston 24, by which arrangement the two pistons can be simultaneously reciprocated from a single drive-shaft. The base of the hollow rod 46 is provided with an offset 47, from which depends a plate 48, having a basal cut-away portion 49, adapted to embrace the shaft 8, located within the chamber of the depending extension 10. The lower end or extension of the piston-rod 45 has a similar plate 48', having a similar alining cut-away portion 49', also adapted to embrace the shaft 8 during the reciprocation of the piston-rod, of which it forms a part. Formed along the inner adjacent faces of the plates 48 48' and extending laterally at right angles from each side of the cut-away portions 49 49' are pockets or depressions 50 of suitable depth, the edges 51 of the pockets not being continuous with the sides of the cut-away portions, but making an offset 52 with said sides. In each of the depressions is adapted to fit and be guided a dog 53 of a thickness equal to the depth of the depression, so that the face of the dog shall be flush with the inner face of the plates 48 48', in which the depressions are formed. Each dog has a terminal shoulder or right-angled deflected portion 54 of a thickness equal to the depth of the offset 52, so that when the dog is placed into the depression with the inner face of the shoulder in contact with the edge 50 the outer face of the shoulder will be flush with or form a continuation of the sides of the cut-away portions 49 49', as best seen in Fig. 12, it being understood that when the parts are in their normal position—that is, when the pistons 23 24 occupy positions intermediate of their extreme strokes in either direction—the centers of the sockets 50 will be nearest the shaft 8—that is, the sockets will be symmetrically disposed on either side of the shaft 8. (See Fig. 12.) As the sockets 50 are formed along the inner surfaces of the plates 48 48', the shoulder 54 of each dog will necessarily project outwardly—that is, from the side of the outer face of each plate. Now each shoulder 54 has disposed centrally about its free longitudinal edge a pin 55, which is adapted to operate in a cam-slot 56, formed along the inner surface of each of the side walls of the depending extension-chamber 10, there being one cam-slot for each dog. Now it is obvious that as the pistons 23 24 are reciprocated to and from each other the plates 48 48' will be correspondingly reciprocated, and the dogs carried by and guided in the sockets 50 of said plates will also be reciprocated, but in the reciprocation of the dogs the latter are compelled to follow in the path of the cam-slots 56, bringing the dogs together at the limit of each stroke and gradually forcing the dogs apart as they approach the medial or basal portions of the slots.

The foregoing merely describes the path taken by the dogs during the reciprocation of the pistons, but in reality it is through the dogs that motion is imparted to the pistons. This is accomplished as follows: Secured to the shaft 8 and interposed between the adjacent surfaces of the plates 48 48' is a disk 57, having diametrically disposed thereon and on opposite faces thereof a pin 58, on which revolves an antifriction-roller 59. Each roller 59 is adapted to operate in the guideway formed by the walls of the longitudinal slot or groove 60 of each dog. It may be stated in passing that each socket 50 is of sufficient length to allow the dogs to reciprocate within it a distance equal to the distance between a line joining the free opposite ends of the cam-slot 56 and the base or medial portion of the said slot, and, further, that the length of each groove 60 is such as to allow for a free and uninterrupted passage through them of the rollers 59, carried by the disk 57—that is to say, when the dogs occupy a position along the medial portion of each cam-slot each roller 59 will be at the base of the groove 60. Now as rotation is imparted to the shaft 8 by a depression of the brake-rod sufficient to effect contact between the disks 9 and the tire of the wheel it follows that the disk 57 will be rotated. As the disk 57 rotates, the rollers 59 thereof, operating as they do within the grooves 60 of the dogs, will carry the latter with them; but as the dogs cannot describe a circular path (not being pivotally connected to the rollers) they are obliged to travel along the cam-slots 56 to allow of a free and uninterrupted rotation of the disk 57. The disk with its two diametrically oppositely located rollers 59 acts as two crank-arms, each crank-arm during its revolution driving before it one dog of each pair at a time, the other dog of each pair carried by the plates 48 48' being carried along bodily by the plate to which it is attached until the pistons have each reached the limit of their respective strokes, when the next dog of each pair will be positively driven by the crank-arm. Each pair of dogs, it will be remembered, come together at the limit of each stroke of each piston, (see Fig. 16,) thus (by their grooves 60) forming a continuous guideway for the roller 59 and enabling the latter without interruption to freely pass from the cavity of one dog into the cavity or groove of the next or adjacent dog and drive the particular plate carrying the same in the reverse direction. By the construction described the stroke of either piston corresponds to the full length or distance between the rollers 59, carried by the disk 57, and the device has the advantage of being compact and occupying less room than were the piston-rods pivotally connected to the disk 57 and their respective pistons, as is usual where curvilinear motion is converted into rectilinear motion. Under the present construction the circular motion or component of the reciprocating piston-rods is assumed by the dogs.

As seen from Fig. 12, when the crank arms or rollers 59 are disposed horizontally, the pistons 23 24 occupy a normal position. When the disk 57, however, has made a quarter-revolution, the relative position of the plates 48 48' and dogs carried by them will be as indicated in Fig. 16—that is, the pistons will have reached the limit of their outward stroke and occupy the positions indicated by the extreme dotted lines shown in Fig. 12. When the disk 57 has made a second quarter-revolution, the parts will again occupy the position indicated in full lines in Fig. 12. At the next or third quarter of a revolution they will occupy a position directly reverse to that indicated in Fig. 16—that is, the pistons will have reached the limit of their inward stroke, as indicated by the mean dotted positions in Fig. 12. At the fourth quarter-revolution they will again occupy the position shown in full lines in Fig. 12. The pistons of course reciprocate simultaneously in opposite directions within the same air-cylinder, being driven by a single drive-shaft 8. The entire length of piston-rod reciprocates along a rectilinear line, the circular component of the motion imparted by the disk 57 being taken up by the dogs, as already described. As seen from the drawings, the piston 46 passes through a suitable stuffing-box at the base of the casing 1.

To insure a tight joint between the interior surface of the air-cylinder 14 and the pistons 23 24, I construct each piston-head as follows: Referring particularly to Figs. 6 and 11, each piston-rod has a screw-threaded end, over which are passed two nuts 61 61, separated a slight distance. Said nuts confine between them a radially-split basin-shaped disk 62, which is loosely passed over said screw-threaded end. Secured also to the piston-rod and bearing against the edge of the disk 62 on the side adjacent to the basin portion thereof is a plate 63. Adjacent to the plate 63 is a leather packing-disk 64, having a flange portion 65 folded over the peripheral meeting edges of the said disk and plate. Each piston-rod carries two such piston heads or sections placed back to back and adjacent to one another—that is to say, the flanges of the packing-disks are deflected in opposite directions, as best seen in Figs. 6 and 11. The effect of such a construction is that as the piston—for example, piston 24 in Fig. 6—travels in the direction shown by the arrow it compresses the air on the under side thereof, the effect of such accumulation of pressure being to bear against the under surface of the lower piston head or section, which pressure is transmitted to the plate 63, and from this it is transmitted to the split disk 62, causing the segments thereof to expand or spread outwardly against the flange 65 of the packing-disk and pressing said flange tightly against the inner surface of the air-cylinder. On the reverse stroke of the piston of course the opposite packing-disk is thus forced against the wall of the air-cylinder, making an absolutely air-tight connection between the packing and cylinder.

The bottom of the depending chamber 10 is closed by a cover 90, which acts as an oil-basin, from which the disk 57 can take up a sufficient quantity of oil to feed the several parts contained within the chamber.

It will be observed that the pump, which by its nature is capable of producing an immense volume of air, is especially applicable for operating a whistle of the character here described. However, inasmuch as the pump forms in itself a distinct invention capable of being used in other relations and on a large scale for commercial purposes—such as for air-compressors, air-pumps, water-pumps, and the like—no specific claim therefor is here made, the same being made the subject-matter of a separate application, filed under date of April 2, 1897, Serial No. 630,427. With the two pistons reciprocating in the same cylinder there will always be three places for the air to discharge into the air-storage chamber—that is, one escape-opening on each side of the two pistons. With the piston-rods telescoping, as here illustrated, the same drive-shaft may be employed to operate them from the same side of the pistons of which they form a part.

Having described my invention, what I claim is—

1. In a bicycle signal-alarm, a suitable air-pump, means for varying the position of said pump relatively to the running-gear of the machine, a sounding device or signal operated thereby, means for operating the pump from the running-gear of the machine, and suitable means for shutting off communication between the air-pump and sounding device, substantially as set forth.

2. In a bicycle signal-alarm, a suitable air-pump secured to and controlled by the brake-rod of the machine, a signal device normally in communication with the air-pump, the air-pump being adapted to be set in motion by the wheel of the bicycle upon a partial depression of the brake-rod and sound the signal device, and means carried by the air-pump for shutting off communication between the air-pump and signal device upon a further depression of the brake-rod, substantially as set forth.

3. In a bicycle signal-alarm, a suitable air-pump carried by the brake-rod and adapted to be set in motion upon the depression of said rod, by the wheel of the machine, independent means for operating the pump when the brake-rod is in its normal position, a suitable air-chamber, means for shutting off communication between the air-chamber and the signal device, and a suitable plug carried by the air-chamber whereby upon removal of the same a suitable tube can be inserted and lead the air from the chamber to the tire of the wheel for inflating the same, substantially as set forth.

4. In a bicycle signal-alarm, an air-pump carried by and controlled by the brake-rod of the machine, an air-cylinder forming a part of said pump, an air-storage chamber communicating with said cylinder, an air-expansion chamber communicating with the storage-chamber, a whistle normally in communication with the expansion-chamber, means for bringing the operating mechanism of the air-pump in contact with the tire upon a partial depression of the brake-rod, a spring-controlled valve interposed between the storage-chamber and the expansion-chamber, and suitable means carried by the pump-cylinder for seating said valve upon a further depression of the brake-rod and thus shut off communication between the air-chamber and expansion-chamber, allowing the air to accumulate in the air-chamber, thus resisting the action of the pump and converting the device into a brake mechanism, substantially as set forth.

5. In a bicycle signal-alarm, a suitable casing, an air-cylinder and air-chamber forming part of the same, an expansion-chamber communicating with the air-chamber, a spring-controlled valve controlling the communication between the air-chamber and expansion-chamber, a rocking arm projecting from the casing or chamber of said valve, the inner end of said arm adapted to depress the valve against the resiliency of the spring, a spring-controlled rod carried on the side of the casing, a pin projecting from the front post of the machine and adapted to support one end of the said rod, the upper end of said rod adapted to tilt the rocking arm upon a maximum depression of the brake-rod and thus depress or seat the valve interposed between the air-chamber and expansion-chamber, substantially as set forth.

6. In a bicycle signal-alarm, a suitable air-chamber and expansion-chamber, a valve casing or chamber mounted above the air-chamber, a spring controlling the valve in said chamber, a rocking arm passed through the wall of the valve-chamber and adapted to depress the valve, a cover for said valve-chamber, and a screw-bolt carried by the cover and adapted to be screwed against an inner end of the rocking arm to temporarily retain the valve against its seat, substantially as set forth.

7. In a bicycle signal-alarm, a suitable air-pump, driving-disks for the same, means for imparting motion to said disks upon a partial depression of the brake-rod of the machine, an air-storage chamber for the pump and suitable means coöperating with the air-pump for compressing the air in the storage-chamber and resisting further rotation of the disks upon an increased depression of the brake-rod, thus converting the driving-disks into a brake mechanism for the wheel, substantially as set forth.

In testimony whereof I affix my signature in presence of two witnesses.

CHAS. O. SOBINSKI.

Witnesses:
ALFRED A. MATHEY,
E. STAREK.